United States Patent
Xu et al.

(10) Patent No.: US 10,288,752 B2
(45) Date of Patent: May 14, 2019

(54) AUTOMATIC FOCUS IDENTIFICATION METHOD AND SYSTEM FOR KARST CAVE RESERVOIR

(71) Applicants: CHINA PETROLEUM & CHEMICAL CORPORATION, Beijing (CN); SINOPEC GEOPHYSICAL RESEARCH INSTITUTE, Nanjing (CN)

(72) Inventors: Kai Xu, Nanjing (CN); Jinliang Tang, Nanjing (CN); Shixing Wang, Nanjing (CN)

(73) Assignees: CHINA PETROLEUM & CHEMICAL CORPORATION, Beijing (CN); SINOPEC GEOPHYSICAL RESEARCH INSTITUTE, Nanjing (CN)

( * ) Notice: Subject to any disclaimer, the term of this patent is extended or adjusted under 35 U.S.C. 154(b) by 121 days.

(21) Appl. No.: 15/697,745

(22) Filed: Sep. 7, 2017

(65) Prior Publication Data
US 2018/0067219 A1    Mar. 8, 2018

(30) Foreign Application Priority Data

Sep. 7, 2016   (CN) .......................... 2016 1 0805294
Sep. 7, 2016   (CN) .......................... 2016 1 0807449

(51) Int. Cl.
*G01V 1/00*  (2006.01)
*G01V 1/30*  (2006.01)
*G01V 1/28*  (2006.01)

(52) U.S. Cl.
CPC .............. *G01V 1/303* (2013.01); *G01V 1/282* (2013.01); *G01V 1/302* (2013.01); *G01V 1/307* (2013.01)

(58) Field of Classification Search
CPC ....................................... G01V 1/303
USPC ............................................. 702/14
See application file for complete search history.

(56) References Cited

U.S. PATENT DOCUMENTS

| | | | | |
|---|---|---|---|---|
| 5,349,527 A * | 9/1994 | Pieprzak | ................ | G01V 1/301 367/45 |
| 5,671,136 A * | 9/1997 | Willhoit, Jr. | ............. | G01V 1/30 702/18 |
| 2004/0093163 A1* | 5/2004 | Reshef | .................... | G01V 1/303 702/14 |

(Continued)

*Primary Examiner* — Hien D Khuu
(74) *Attorney, Agent, or Firm* — Buchanan Ingersoll & Rooney PC

(57) ABSTRACT

Disclosed are an automatic focus identification method and a system for a Karst cave reservoir. According to the method, velocity replacement is performed based on a pre-stack time migration velocity model to obtain a plurality of replacement migration velocity volumes; pre-stack time migration is performed based on the plurality of replacement migration velocity volumes to obtain a plurality of post-stack seismic data volumes; a three dimensional cube window is selected based on a seismic response characteristic of the Karst cave reservoir; sparse statistical data of a seismic trace or sparse statistical data of a seismic trace attribute of each of the post-stack seismic data volumes in the three dimensional cube window are obtained respectively; and an optimized migration velocity and an optimized seismic trace are obtained through optimization determination.

26 Claims, 9 Drawing Sheets

(56) References Cited

U.S. PATENT DOCUMENTS

| | | | |
|---|---|---|---|
| 2005/0197779 A1* | 9/2005 | Stinson | G01V 1/303 |
| | | | 702/14 |
| 2006/0203613 A1* | 9/2006 | Thomsen | G01V 3/083 |
| | | | 367/38 |
| 2007/0255501 A1* | 11/2007 | Kellogg | G01V 1/28 |
| | | | 702/16 |
| 2009/0052280 A1* | 2/2009 | Herrmann | G01V 1/28 |
| | | | 367/53 |
| 2014/0032119 A1* | 1/2014 | Landa | G01V 1/30 |
| | | | 702/14 |
| 2017/0115418 A1* | 4/2017 | Gratacos | G01V 1/282 |
| 2018/0321403 A1* | 11/2018 | Al-Dossary | G01V 1/364 |

* cited by examiner

AUTOMATIC FOCUS IDENTIFICATION METHOD AND SYSTEM FOR KARST CAVE RESERVOIR

CROSS REFERENCE TO RELATED APPLICATIONS

The present application claims the priority of Chinese patent application CN201610807449.8, entitled "Focus Optimizing Method and System for Beads-Shaped Seismic Response Characteristics" and filed on Sep. 7, 2016, and Chinese patent application CN201610805294.4, entitled "Focus Optimizing Method and System for Beads-Shaped Seismic Response Characteristics" and filed on Sep. 7, 2016, the entirety of which are incorporated herein by reference.

FIELD OF THE INVENTION

The present disclosure relates to the technical field of seismic exploration, and particularly to an automatic focus identification method and a system for a Karst cave reservoir.

BACKGROUND OF THE INVENTION

In seismic exploration field, carbonate rocks, as an unconventional reservoir, usually develop into large Karst caves, which show beads-shaped seismic response characteristics ("beads" for short) in a seismic profile. The "beads" imaging is closely related to a migration velocity model. Specifically, when the migration velocity is too large, the "beads" imaging will bend upwards and have a relatively weak energy; when the migration velocity is too small, the "beads" imaging will bend downwards and have a relatively weak energy; and when the migration velocity has a just right value, the "beads" imaging is convergent and has a strongest energy. However, since conventional velocity spectrum picking is based on a relatively large grid, the migration velocity model is inaccurate. As a result, the "beads" imaging usually bends upwards or downwards. The inaccurate "beads" imaging will not facilitate the following drilling and further reservoir prediction. In order to solve the problem of non-convergence of the "beads" imaging of the carbonate rocks unconventional reservoir, a least-squares migration imaging method is generally used in the prior art to obtain a convergent "beads" imaging.

However, it is discovered that, the calculation consumption of the least-squares migration imaging method is relatively large. The method depends highly on an initial model and the convergence is very easy to fall into a local extremum, which will result in that the beads-shaped seismic response characteristics never converge. A full waveform inversion method is facing a same problem. Therefore, it is necessary to develop an automatic focus identification method and a system for a Karst cave reservoir which can improve a reservoir prediction accuracy.

The information disclosed in the background of the present disclosure only aims at facilitating in-depth understanding on general background technology of the present disclosure, which cannot be considered as admitting or implying in any manner the information constituting conventional knowledge well known for those skilled in the art.

SUMMARY OF THE INVENTION

The present disclosure provides an automatic focus identification method and a system for a Karst cave reservoir. According to the present disclosure, a continuous pre-stack time migration can be performed through migration velocity replacement of a target layer to obtain migration profiles with different imaging effects, and an optimized migration velocity and an optimized seismic trace can be obtained according to a difference among sparse statistical data so as to improve a reservoir prediction accuracy and a drilling success rate.

According to one aspect, the present disclosure provides an automatic focus identification method for a Karst cave reservoir, which comprises steps of:

performing velocity replacement based on a pre-stack time migration velocity model to obtain a plurality of replacement migration velocity volumes;

performing pre-stack time migration based on the plurality of replacement migration velocity volumes to obtain a plurality of post-stack seismic data volumes corresponding to the plurality of replacement migration velocity volumes one to one;

selecting a three dimensional cube window based on a seismic response characteristic of the Karst cave reservoir of seismic data;

obtaining sparse statistical data of a seismic trace, or sparse statistical data of a seismic trace attribute of each of the post-stack seismic data volumes respectively in the three dimensional cube window; and obtaining an optimized migration velocity and an optimized seismic trace through optimization determination, based on the sparse statistical data of the seismic trace, or the sparse statistical data of the seismic trace attribute corresponding to all of the post-stack seismic data volumes.

Preferably, the sparse statistical data of the seismic trace corresponding to the post-stack seismic data volumes are obtained according to L1 norm criterion or Cauchy norm criterion.

Preferably, the method further comprises evaluating a maximum value of the sparse statistical data of the seismic trace and a corresponding subscript based on the sparse statistical data of the seismic trace corresponding to all of the post-stack seismic data volumes so as to obtain the optimized migration velocity and the optimized seismic trace.

Preferably, the method further comprises performing smoothness constraint on the optimized migration velocity and the optimized seismic trace obtained therein respectively.

Preferably, the seismic trace attribute is statistical instantaneous amplitude.

Preferably, a step of obtaining sparse statistical data of the statistical instantaneous amplitude corresponding to a post-stack seismic data volume comprises:

censusing instantaneous amplitudes of the post-stack seismic data volume in the three dimensional cube window according to L1 norm criterion so as to obtain the sparse statistical data of the statistical instantaneous amplitude corresponding to the post-stack seismic data volume.

Preferably, a step of obtaining an optimized migration velocity and an optimized seismic trace through optimization determination based on the sparse statistical data of the statistical instantaneous amplitude corresponding to all of the post-stack seismic data volumes comprises:

evaluating a maximum value of the sparse statistical data of the statistical instantaneous amplitude and a corresponding subscript based on the sparse statistical data of the statistical instantaneous amplitude corresponding to all of the post-stack seismic data volumes so as to obtain the optimized migration velocity and the optimized seismic trace.

Preferably, the method further comprises fitting the sparse statistical data of the statistical instantaneous amplitude corresponding to all of the post-stack seismic data volumes through a least-squares extremum fit algorithm so as to obtain the maximum value of the sparse statistical data of the statistical instantaneous amplitude and the corresponding subscript.

Preferably, the seismic trace attribute is statistical time difference.

Preferably, a step of obtaining sparse statistical data of the statistical time difference corresponding to a post-stack seismic data volume comprises:

censusing time difference information of the post-stack seismic data volume in the three dimensional cube window according to L1 norm criterion so as to obtain the sparse statistical data of the statistical time difference corresponding to the post-stack seismic data volume.

Preferably, a step of censusing the time difference information comprises representing each sampling point of the post-stack seismic data volume in the three dimensional cube window by its surrounding multiple traces and multiple sampling points, performing slide scanning on the seismic data, selecting a center trace as a reference, cross-correlating other traces in the three dimensional cube window with the center trace, and obtaining the time difference information when a cross-correlation function has a maximum value.

Preferably, a step of obtaining an optimized migration velocity and an optimized seismic trace through optimization determination based on the sparse statistical data of the statistical time difference corresponding to all of the post-stack seismic data volumes comprises:

evaluating a minimum value of the sparse statistical data of the statistical time difference and a corresponding subscript based on the sparse statistical data of the statistical time difference corresponding to all of the post-stack seismic data volumes by fitting through a least-squares extremum fit algorithm so as to obtain the optimized migration velocity and the optimized seismic trace.

Preferably, a step of obtaining the plurality of replacement migration velocity volumes comprises:

defining a minimum replacement velocity, a maximum replacement velocity, and a replacement velocity change interval based on the pre-stack time migration velocity model, and performing velocity replacement on an existing migration velocity along a marker bed so as to obtain the plurality of replacement migration velocity volumes.

According to the other aspect, the present disclosure provides an automatic focus identification system for a Karst cave reservoir, which comprises:

a replacement module, configured to perform velocity replacement based on a pre-stack time migration velocity model to obtain a plurality of replacement migration velocity volumes;

a migration module, configured to perform pre-stack time migration, based on the plurality of replacement migration velocity volumes, to obtain a plurality of post-stack seismic data volumes corresponding to the plurality of replacement migration velocity volumes one to one;

a selecting module, configured to select a three dimensional cube window based on a seismic response characteristic of the Karst cave reservoir of seismic data;

a first obtaining module, configured to obtain sparse statistical data of a seismic trace or sparse statistical data of a seismic trace attribute of each of the post-stack seismic data volumes in the three dimensional cube window respectively; and a second obtaining module, configured to obtain an optimized migration velocity and an optimized seismic trace through optimization determination based on the sparse statistical data of the seismic trace or the sparse statistical data of the seismic trace attribute corresponding to all of the post-stack seismic data volumes.

Preferably, the first obtaining module is specifically configured to obtain the sparse statistical data of the seismic trace corresponding to the post-stack seismic data volumes according to L1 norm criterion or Cauchy norm criterion.

Preferably, the second obtaining module is specifically configured to evaluate a maximum value of the sparse statistical data of the seismic trace and a corresponding subscript based on the sparse statistical data of the seismic trace corresponding to all of the post-stack seismic data volumes so as to obtain the optimized migration velocity and the optimized seismic trace.

Preferably, the system further comprises a constraint module which is configured to perform smoothness constraint on the optimized migration velocity and the optimized seismic trace obtained therein respectively.

Preferably, the seismic trace attribute is statistical instantaneous amplitude.

Preferably, the first obtaining module is specifically configured to census instantaneous amplitudes of a post-stack seismic data volume in the three dimensional cube window according to L1 norm criterion so as to obtain the sparse statistical data of the statistical instantaneous amplitude corresponding to the post-stack seismic data volume.

Preferably, the second obtaining module is specifically configured to evaluate a maximum value of the sparse statistical data of the statistical instantaneous amplitude and a corresponding subscript based on the sparse statistical data of the statistical instantaneous amplitude corresponding to all of the post-stack seismic data volumes so as to obtain the optimized migration velocity and the optimized seismic trace.

Preferably, the second obtaining module is specifically configured to fit the sparse statistical data of the statistical instantaneous amplitude corresponding to all of the post-stack seismic data volumes through a least-squares extremum fit algorithm so as to obtain the maximum value of the sparse statistical data of the statistical instantaneous amplitude and the corresponding subscript.

Preferably, the seismic trace attribute is statistical time difference.

Preferably, the first obtaining module is specifically configured to census time difference information of a post-stack seismic data volume in the three dimensional cube window according to L1 norm criterion so as to obtain the sparse statistical data of the statistical time difference corresponding to the post-stack seismic data volume.

Preferably, the first obtaining module is specifically configured to represent each sampling point of the post-stack seismic data volume in the three dimensional cube window by its surrounding multiple traces and multiple sampling points, perform slide scanning on the seismic data, select a center trace as a reference, cross-correlate other traces in the three dimensional cube window with the center trace, and obtain the time difference information when a cross-correlation function has a maximum value.

Preferably, the second obtaining module is specifically configured to evaluate a minimum value of the sparse statistical data of the statistical time difference and a corresponding subscript, based on the sparse statistical data of the statistical time difference corresponding to all of the post-stack seismic data volumes, by fitting through a least-squares extremum fit algorithm, so as to obtain the optimized migration velocity and the optimized seismic trace.

Preferably, the replacement module is specifically configured to define a minimum replacement velocity, a maximum replacement velocity, and a replacement velocity change interval based on the pre-stack time migration velocity model, and perform velocity replacement on an existing migration velocity along a marker bed so as to obtain the plurality of replacement migration velocity volumes.

Compared with the prior art, one embodiment or a plurality of embodiments in the aforesaid technical solutions can have the following advantages or beneficial effects.

According to the present disclosure, the continuous pre-stack time migration can be performed through migration velocity replacement of the target layer to obtain migration profiles with different imaging effects, and the optimized migration velocity and the optimized seismic trace can be obtained according to the difference among sparse statistical data so as to improve the reservoir prediction accuracy and the drilling success rate.

The method and apparatus of the present disclosure have other features and advantages, which will become self-evident from the drawings and the specific embodiments incorporated herein, or will be illustrated in detail in the drawings and the specific embodiments. The drawings and the specific embodiments are used for illustrating specific principles of the present disclosure.

BRIEF DESCRIPTION OF THE DRAWINGS

The embodiments of the present disclosure will be illustrated in detail hereinafter with reference to the drawings, whereby the abovementioned and other targets, features, and advantages of the present disclosure will become more obvious. In the embodiments, a same reference sign usually represents a same component.

DETAILED DESCRIPTION OF THE EMBODIMENTS

Figure 1:
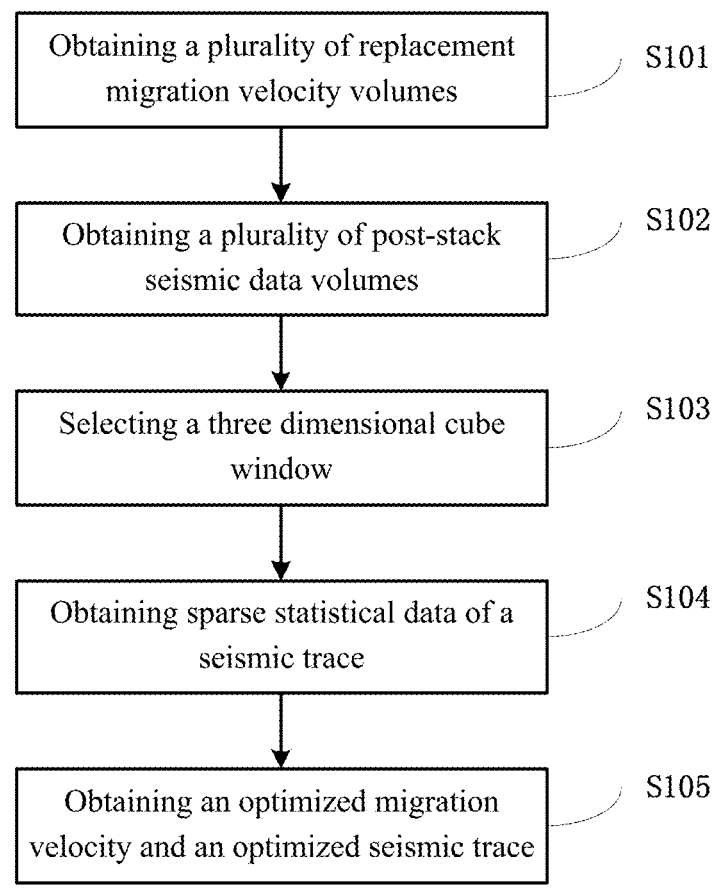
FIG. 1 is a flow chart of an automatic focus identification method for a Karst cave reservoir according to embodiment 1 of the present disclosure.

The present disclosure will be illustrated in detail hereinafter with reference to the drawings. Although the preferred embodiments are shown in the drawings, it can be understood that, the present disclosure can be realized in many forms without restricted by the embodiments disclosed herein. The embodiments disclosed herein are used for providing a thorough and complete understanding of the present disclosure, as well as conveying the protection scope thereof to those skilled in the art.

Embodiment 1

FIG. 1 is a flow chart of an automatic focus identification method for a Karst cave reservoir according to embodiment 1 of the present disclosure. As shown in FIG. 1, according to the present embodiment, the automatic focus identification method for the Karst cave reservoir mainly includes step S101 to step S105.

Specifically, in step S101, velocity replacement is performed based on a pre-stack time migration velocity model to obtain a plurality of replacement migration velocity volumes.

In step S102, pre-stack time migration is performed based on the plurality of replacement migration velocity volumes to obtain a plurality of post-stack seismic data volumes corresponding to the plurality of replacement migration velocity volumes one to one.

In step S103, a three dimensional cube window is selected based on a seismic response characteristic of the Karst cave reservoir of seismic data.

In step S104, sparse statistical data of a seismic trace, or sparse statistical data of a seismic trace attribute of each of the post-stack seismic data volumes in the three dimensional cube window are obtained respectively.

In step S105, an optimized migration velocity and an optimized seismic trace are obtained through optimization determination based on the sparse statistical data of the seismic trace or the sparse statistical data of the seismic trace attribute corresponding to all of the post-stack seismic data volumes.

The specific steps of the automatic focus identification method for the Karst cave reservoir according to the embodiment of the present disclosure will be illustrated in detail hereinafter.

In one example, velocity replacement is performed based on a pre-stack time migration velocity model to obtain a plurality of replacement migration velocity volumes.

In one example, a step of obtaining the plurality of replacement migration velocity volumes comprises: defining a minimum replacement velocity, a maximum replacement velocity, and a replacement velocity change interval based on the pre-stack time migration velocity model, and performing velocity replacement on an existing migration velocity along a marker bed so as to obtain the plurality of replacement migration velocity volumes. Specifically, velocity replacement is performed on an existing pre-stack time migration velocity model along a marker bed. An existing migration velocity is defined as v, and the minimum replacement velocity, the maximum replacement velocity, as well as a proper replacement velocity change interval are defined to obtain different replacement migration velocity volumes.

In one example, pre-stack time migration is performed based on the plurality of replacement migration velocity volumes to obtain the plurality of post-stack seismic data volumes. Specifically, a continuous pre-stack time migration can be performed according to an existing pre-stack time migration processing step in a construction site to obtain different post-stack seismic data volumes.

In one example, a three dimensional cube window is selected based on beads-shaped seismic response characteristics of seismic data. Then, based on the post-stack seismic data volumes obtained therein, the sparse statistical data of the seismic trace or sparse statistical data of the seismic trace attribute of each of the post-stack seismic data volumes in the three dimensional cube window are obtained respectively. Here, the seismic trace attribute is statistical instantaneous amplitude or statistical time difference. The implementations relating to the two seismic trace attributes will be illustrated in detail below.

In one example, the optimized migration velocity and the optimized seismic trace are obtained through optimization determination based on the sparse statistical data of the seismic trace or the sparse statistical data of the seismic trace attribute corresponding to all of the post-stack seismic data volumes.

According to one preferred embodiment of the present disclosure, the aforesaid automatic focus identification method further comprises performing smoothness constraint on the optimized migration velocity and the optimized seismic trace obtained therein respectively.

The present embodiment will be illustrated in detail below.

In a selected three dimensional cube window, a convergence of "beads" imaging can be measured by sparse statistical data. Here, the sparse statistical data can be L1 norm, Cauchy norm, and so on. When the sparse statistical data have a minimum value, the "beads" imaging has a best convergence. A target functional φ is defined as:

$$\varphi(V_i) = \|S(V_i)\|_1 \quad (1),$$

wherein $V_i$ is a 3D migration velocity volume in a local window, and $S(V_i)$ is a post-stack seismic data volume obtained by using $V_i$. In a target layer, different degrees of disturbance are performed on an initial velocity, and sparseness measure is performed on a post-stack seismic data volume $S_i$ taking advantage of equation (1). When the target functional φ has a minimum value, the optimized migration velocity and the optimized seismic trace can be obtained.

Slide scanning is performed on the local window, and all data are processed. Then, merging is performed on the velocity model and a post-stack seismic trace. In order to eliminate a splicing effect during a merging procedure, a smoothness constraint is added, and thus the target functional is defined as:

$$\phi(V) = \left\| V - \sum_i V_i \right\|_2 + \|DV\|_1, \quad (2)$$

$$\phi(S) = \left\| S - \sum_i S_i \right\|_2 + \|DS\|_1, \quad (3)$$

wherein V and S are respectively the optimized migration velocity and the optimized seismic trace after merging, $V_i$ and $S_i$ are respectively the optimized migration velocity and the optimized seismic trace after optimization, and D is a smooth operator, which can be selected as a zero order, first order or second order differential operator.

$$\left\| V - \sum_i V_i \right\|_2$$

in the target functional is an L2 norm fitting error term of a merging solution and an initial optimizing solution. $\|DV\|_1$ is an L1 norm regularization term of the merging solution to improve a sparseness of the solution. When the target functional φ has a minimum value, a complete optimized migration velocity and a complete optimized seismic trace after merging can be obtained.

Moreover, according to one preferred embodiment of the present disclosure, in terms of the problem of L1 and L2 mixed norms optimization solving, an iteration solving method can be used through a sparse gradient projection algorithm. According to this method, not only a sparseness of a signal can be effectively ensured, but also an inhibiting ability of the signal on a splicing noise can be enhanced. Therefore, the optimized migration velocity and the optimized seismic trace can be obtained.

The aforesaid sparse gradient projection algorithm specifically includes an initialization procedure, a step calculation procedure, a line search procedure, an updating procedure, and a termination condition determining procedure.

In the initialization procedure, an initial value $V_i^{(0)}$ is provided, a step-length $\alpha^{(0)} \in [\alpha_{min}, \alpha_{max}]$ is selected, and k=0. $V_i^{(0)}$ is an initial migration velocity, $\alpha^{(0)}$ is an initial iteration step-length, $\alpha_{min}$ is a preset minimum value of an iteration step-length, $\alpha_{max}$ is a preset maximum value of the iteration step-length, and k is iteration times.

In the step calculation procedure, a step $\delta^{(k)} = (V_i^{(k)} - \alpha^{(k)} \nabla \phi(V_i^{(k)}))^+ - V_i^k$ is calculated. $\delta^{(k)}$ is a step, i.e., a changing amount of a variable during iteration, $V_i^{(k)}$ is a migration velocity of a $k^{th}$ iteration, $\alpha^{(k)}$ is a iteration step-length of the $k^{th}$ iteration, and $\nabla \phi(V_i^{(k)})$ is a gradient of the target functional. Function $(\,)^+$ means that when a calculation value is a positive value, the calculation value itself is output, and when the calculation value is a negative value, 0 is output.

In the line search procedure, the step-length $\lambda^{(k)} \in [0,1]$ is searched, so that $\phi(V_i^{(k)} + \lambda^{(k)} \delta^{(k)})$ has a minimum value. An estimation value $V_i^{(k+1)} = V_i^{(k)} + \lambda^{(k)} \delta^{(k)}$ is updated. $\lambda^{(k)}$ is a search step-length. $\delta^{(k)}$ is an intermediate variable and is used for regulating an iteration changing amount.

In the updating procedure $\gamma^{(k)} = \delta^{(k)} \cdot \delta^{(k)}$ is calculated. An updated value of $\alpha^{(k-1)}$ can be obtained:

$$\alpha^{(k+1)} = \begin{cases} \alpha_{max}, & \gamma^{(k)} = 0 \\ \mathrm{mid}\left\{\alpha_{min}, \frac{\|\delta^{(k)}\|_2^2}{\gamma^{(k)}}, \alpha_{max}\right\}, & \text{otherwise} \end{cases}$$

In the termination condition determining procedure, whether the termination condition $V_i^{(k+1)} - V_i^{(k)} \le 0.1$ is satisfied is determined. $V_i^{(k+1)}$ is a migration velocity of a $(k+1)^{th}$ iteration, $V_i^{(k)}$ is the migration velocity of the $k^{th}$ iteration, and mid{ } means to obtain a second largest value among three values. If the termination condition is satisfied, $V_i^{(k+1)}$ is output; and if the termination condition is not satisfied, the step calculation procedure is returned.

In a word, according to the present embodiment, a continuous pre-stack time migration can be performed through migration velocity replacement of a target layer to obtain migration profiles with different imaging effects, and the optimized migration velocity and the optimized seismic trace can be obtained according to a difference among sparse statistical data so as to improve a reservoir prediction accuracy and a drilling success rate.

Embodiment 2

According to the present embodiment, step S104 and step S105 are optimized on the basis of embodiment 1.

In step S104, sparse statistical data of a seismic trace of each of the post-stack seismic data volumes in the three dimensional cube window are obtained.

Specifically, the sparse statistical data of the seismic trace corresponding to the post-stack seismic data volumes are obtained according to L1 norm criterion or Cauchy norm criterion.

In step S105, an optimized migration velocity and an optimized seismic trace are obtained through optimization determination based on the sparse statistical data of the seismic trace corresponding to all of the post-stack seismic data volumes.

Specifically, a maximum value of the sparse statistical data of the seismic trace and a corresponding subscript are evaluated based on the sparse statistical data of the seismic trace corresponding to all of the post-stack seismic data volumes so as to obtain the optimized migration velocity and the optimized seismic trace.

Embodiment 3

According to the present embodiment, step S104 and step S105 are further optimized on the basis of embodiment 1, and new steps S204 and S205 are obtained. According to the present embodiment, the seismic trace attribute is statistical instantaneous amplitude.

Figure 2:
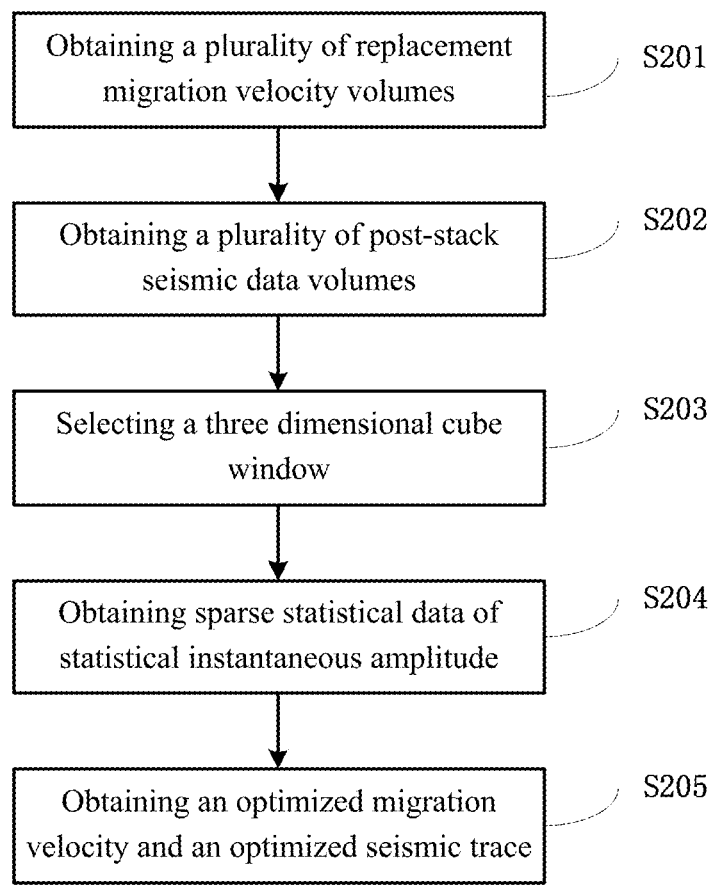
FIG. 2 is a flow chart of an automatic focus identification method for a Karst cave reservoir according to embodiment 3 of the present disclosure.

FIG. 2 is a flow chart of an automatic focus identification method for a Karst cave reservoir according to embodiment 3 of the present disclosure. As shown in FIG. 2, according to embodiment 3, the automatic focus identification method for the Karst cave reservoir mainly includes step S201 to step S205, in which steps S201 to S203 are respectively the same as steps S101 to S103 in embodiment 1, and the details thereof will not be repeated here.

In step S204, sparse statistical data of the statistical instantaneous amplitude corresponding to the post-stack seismic data volumes are obtained.

Specifically, instantaneous amplitudes of a post-stack seismic data volume in the three dimensional cube window are censused according to L1 norm criterion so as to obtain the sparse statistical data of the statistical instantaneous amplitude corresponding to the post-stack seismic data volume.

Specifically, according to "beads" imaging size of actual data, a proper three dimensional cube window can be selected (each sampling point attribute is represented by its surrounding multiple traces and attributes of multiple sampling points), and a slide scanning is performed on seismic data. The instantaneous amplitudes in each of the three dimensional cube window are censused according to L1 norm criterion so as to obtain the statistical instantaneous amplitude corresponding to the post-stack seismic data volume (i.e., the sparse statistical data of the statistical instantaneous amplitude).

Here, a relation between a post-stack seismic data volume s(t) and a corresponding instantaneous amplitude Amp(t) meets following equations:

$$s(t)=Re(t)+i \cdot Im(t) \qquad (4)$$

$$Amp(t)=\sqrt{Re(t)^2+Im(t)^2} \qquad (5),$$

wherein s(t) is the post-stack seismic data volume, Amp(t) is the instantaneous amplitude corresponding to the post-stack seismic data volume, Re(t) is a real part of the post-stack seismic data volume, and Im(t) is an imaginary part of the post-stack seismic data volume.

In step S205, an optimized migration velocity and an optimized seismic trace are obtained through optimization determination based on the sparse statistical data of the statistical instantaneous amplitude corresponding to all of the post-stack seismic data volumes.

Specifically, a maximum value of the sparse statistical data of the statistical instantaneous amplitude and a corresponding subscript are evaluated based on the sparse statistical data of the statistical instantaneous amplitude corresponding to all of the post-stack seismic data volumes so as to obtain the optimized migration velocity and the optimized seismic trace. Preferably, the sparse statistical data of the statistical instantaneous amplitude corresponding to all of the post-stack seismic data volumes are fitted through a least-squares extremum fit algorithm so as to obtain the maximum value of the sparse statistical data of the statistical instantaneous amplitude and the corresponding subscript (i.e., an optimized subscript). Then, the optimized seismic trace and the optimized migration velocity are obtained.

According to the present embodiment, a continuous pre-stack time migration can be performed through migration velocity replacement of a target layer to obtain migration profiles with different imaging effects, and the optimized migration velocity and the optimized seismic trace can be obtained according to a difference among amplitude energies so as to improve a reservoir prediction accuracy and a drilling success rate.

Embodiment 4

According to the present embodiment, step S104 and step S105 are further optimized on the basis of embodiment 1, and new steps S304 and S305 are obtained. According to the present embodiment, the seismic trace attribute is statistical time difference.

Figure 3:
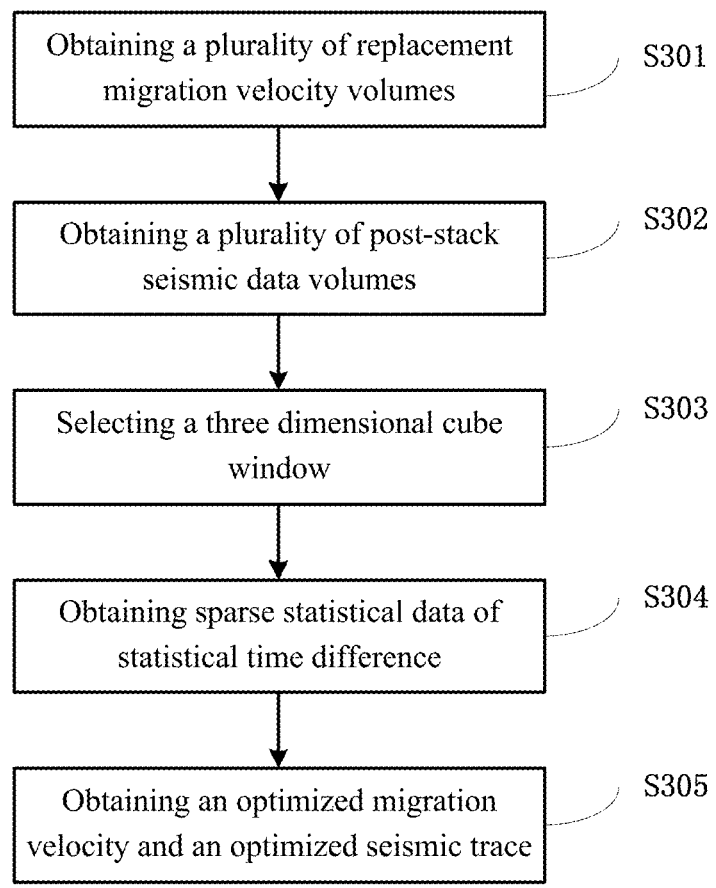
FIG. 3 is a flow chart of an automatic focus identification method for a Karst cave reservoir according to embodiment 4 of the present disclosure.

FIG. 3 is a flow chart of an automatic focus identification method for a Karst cave reservoir according to embodiment 4 of the present disclosure. As shown in FIG. 3, according to embodiment 4, the automatic focus identification method for the Karst cave reservoir mainly includes step S301 to step S305, in which steps S301 to S303 are respectively the same as steps S101 to S103 in embodiment 1, and the details thereof will not be repeated here.

In step S304, sparse statistical data of the statistical time difference corresponding to the post-stack seismic data volumes are obtained.

Specifically, time difference information of the post-stack seismic data volumes in the three dimensional cube window is censused according to L1 norm criterion so as to obtain the sparse statistical data of the statistical time difference corresponding to the post-stack seismic data volumes.

Here, the step of censusing the time difference information comprises representing each sampling point of the post-stack seismic data volume in the three dimensional cube window by its surrounding multiple traces and multiple sampling points, performing slide scanning on the seismic data, selecting a center trace as a reference, cross-correlating other traces in the three dimensional cube window with the center trace, and obtaining the time difference information when a cross-correlation function has a maximum value.

Specifically, according to a size of a beads-shaped seismic response characteristic of actual seismic data, a proper three dimensional cube window can be selected (each sampling point attribute is represented by its surrounding multiple traces and attributes multiple sampling points), and a slide scanning is performed on seismic data. A center trace is selected as a reference, and other traces in the three dimensional cube window are cross-correlated with the center trace. Time difference information of each trace is recorded when a cross-correlation function has a maximum value.

The cross-correlation function can be expressed as:

$$R_{12}(\tau) = \int_{-\infty}^{+\infty} f_1(t) f_2(t+\tau) dt \qquad (6)$$

wherein $R_{12}(\tau)$ is the cross-correlation function, $f_1(t)$ is the center trace as the reference in the three dimensional cube window, $f_2(t)$ represents other traces in the three dimensional cube window, $\tau$ is a delay amount, and $dt$ represents an increment of an independent variable tin the integral.

Then, time differences of different post-stack seismic data volumes in the three dimensional cube window are censused according to L1 norm criterion so as to obtain statistical time difference corresponding to the post-stack seismic data volumes (i.e., the sparse statistical data of the statistical time difference).

In step S305, an optimized migration velocity and an optimized seismic trace are obtained through optimization determination based on the sparse statistical data of the statistical time difference corresponding to all of the post-stack seismic data volumes.

Specifically, a minimum value of the sparse statistical data of the statistical time difference and a corresponding subscript (i.e., an optimized subscript) are evaluated based on the sparse statistical data of the statistical time difference corresponding to all of the post-stack seismic data volumes by fitting through a least-squares extremum fit algorithm so as to obtain the optimized migration velocity and the optimized seismic trace. Actually, when the statistical time difference has a minimum value, it corresponds to the situation that the beads-shaped seismic response characteristics have a best convergence. A minimum value of the statistical time difference and a corresponding optimized subscript are evaluated by fitting the statistical time difference through a least-squares extremum fit algorithm so as to obtain the optimized migration velocity and the optimized seismic trace.

According to the present embodiment, a continuous pre-stack time migration can be performed through migration velocity replacement of a target layer to obtain migration profiles with different imaging effects, and the optimized migration velocity and the optimized seismic trace can be obtained according to the statistical time difference in the three dimensional cube window so as to improve a reservoir prediction accuracy and a drilling success rate.

In order to facilitate understanding of technical solutions and technical effects of the embodiments of the present disclosure, two application examples are provided below, wherein application example 1 corresponds to embodiment 3, and application example 2 corresponds to embodiment 4. It can be understood that, the application examples are only used for facilitating understanding of the present disclosure, and the specific details thereof are not intended to restrict the present disclosure in any manner.

Application Example 1

Figure 4:
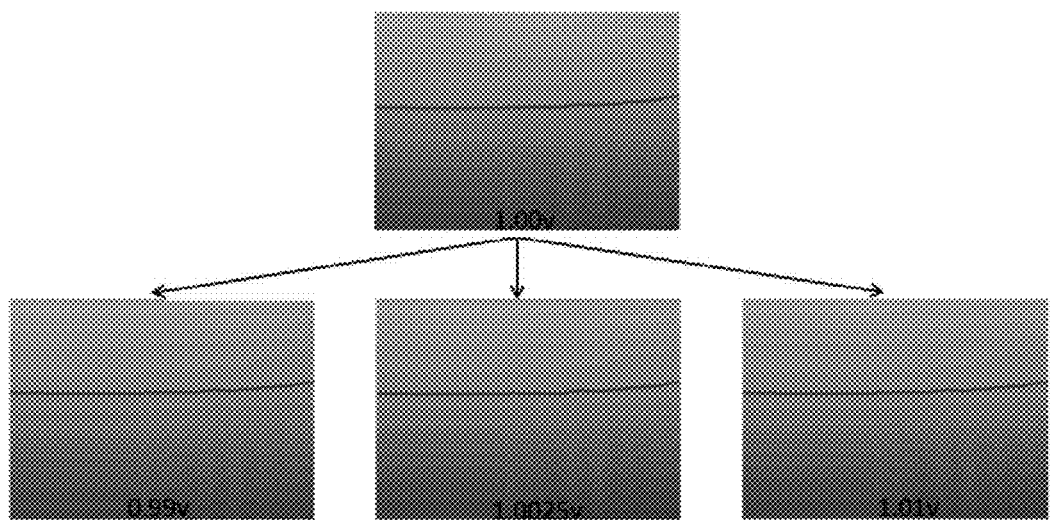
FIG. 4 schematically shows along layer velocity replacement according to application example 1 or application example 2 of the present disclosure.

FIG. 4 schematically shows along layer velocity replacement according to application example 1 or application example 2 of the present disclosure. As shown in FIG. 4, according to a velocity of an actual stratum in Xinjiang work area of China, it is assumed that an initial migration velocity is v, a minimum replacement velocity is 0.99 v, a maximum replacement velocity is 1.01 v, and a replacement velocity change interval is 0.0025 v.

Figure 5A:
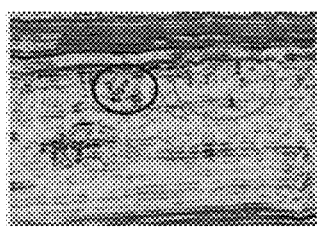
FIGS. 5a to 5i are sectional views of along layer velocity replacement pre-stack time migration according to application example 1 or application example 2 of the present disclosure.
Figure 5B:
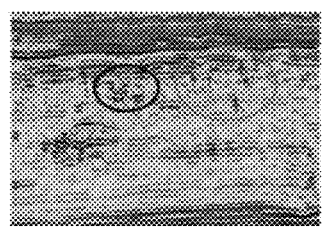
Figure 5C:
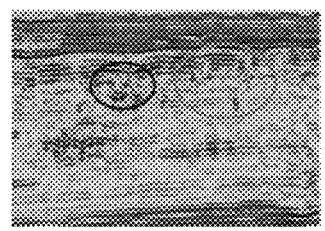
Figure 5D:
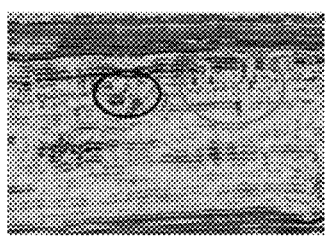
Figure 5E:
Figure 5F:
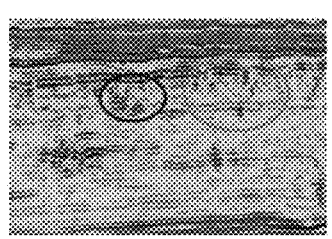
Figure 5G:
Figure 5H:
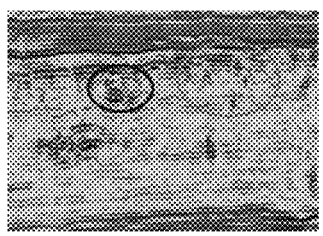
Figure 5I:
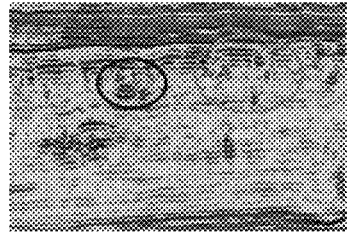

FIGS. 5a to 5i are sectional views of along layer velocity replacement pre-stack time migration according to application example 1 or application example 2 of the present disclosure. Continuous pre-stack time migration is performed according to different replacement velocities to obtain different post-stack seismic data volumes. The migration result of initial migration velocity v is shown in FIG. 5e, the migration results of replacement velocities in FIGS. 5a to 5d are respectively 0.99 v, 0.9925 v, 0.995 v, and 0.9975 v, and the replacement velocities in FIGS. 5f to 5i are respectively 1.0025 v, 1.005 v, 1.0075 v, and 1.01 v. Therefore, 9 migration stacking volumes based on different migration velocities can be obtained.

Figure 6:
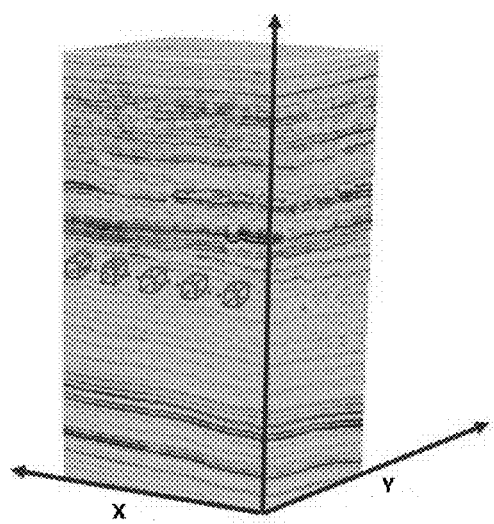
FIG. 6 shows a scanning diagram of a three dimensional cube window according to application example 1 or application example 2 of the present disclosure.

FIG. 6 shows a scanning diagram of a three dimensional cube window according to application example 1 or application example 2 of the present disclosure, wherein x axis is a cross-line (Xline), and y axis is an in-line. A proper three dimensional cube window is selected according to a size of a beads-shaped seismic response characteristic of the seismic data. In this work area, a 7×7×15 window is selected. That is, the window is represented by 7 in-lines, 7 cross-lines, and 15 time sampling points. The amplitude attributes of different replacement migration velocity volumes in the three dimensional cube window are censused according to L1 norm criterion.

Figure 7:
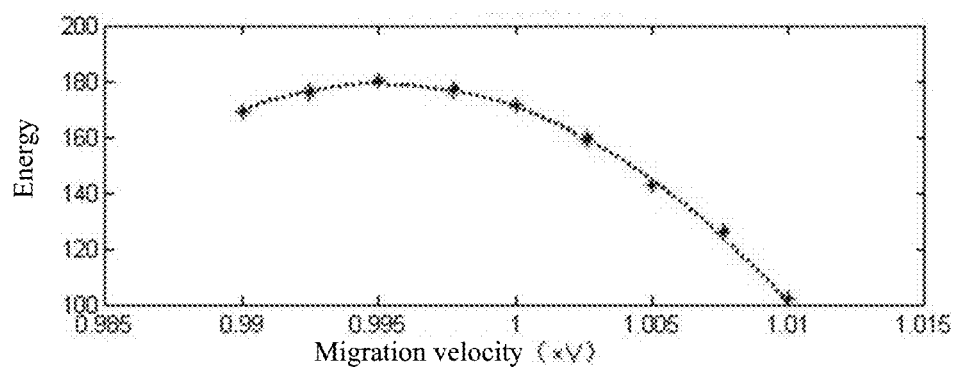
FIG. 7 schematically shows changing of amplitude energy of an imaging point with migration velocity according to application example 1 of the present disclosure.

FIG. 7 schematically shows changing of amplitude energy of an imaging point with migration velocity according to application example 1 of the present disclosure. Taking one imaging point as an example, each of the data has an optimized amplitude value and a corresponding subscript. Therefore, an amplitude extremum and a corresponding subscript are evaluated through a least-squares extremum fit algorithm so as to obtain the optimized migration velocity and the optimized seismic trace.

Figure 8:
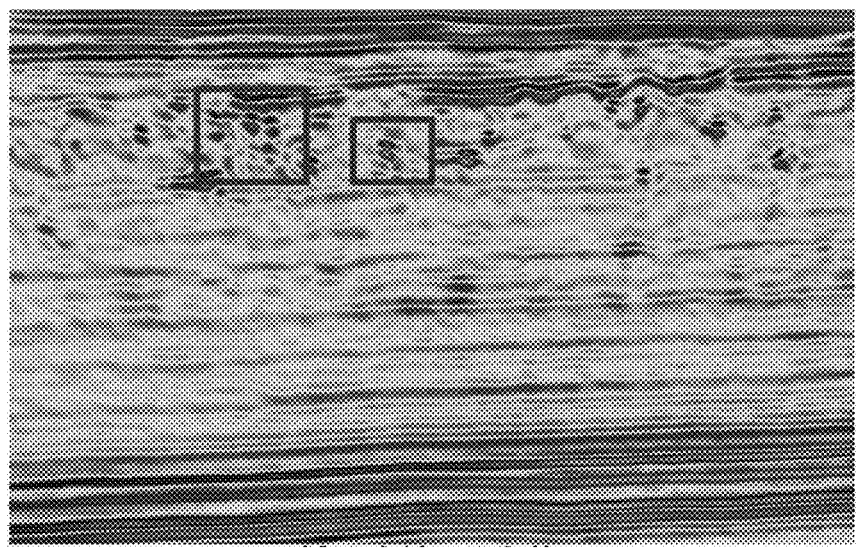
FIG. 8 shows a diagram of an optimization sectional view of a crossline according to application example 1 of the present disclosure.
Figure 9A:
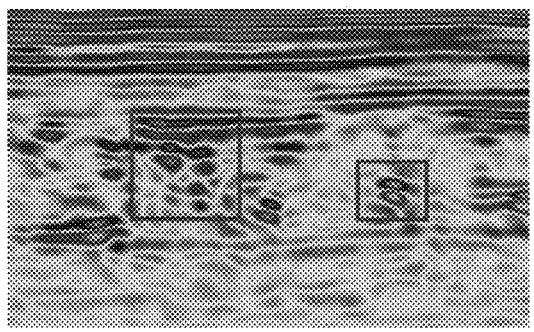
FIGS. 9a and 9b respectively show an enlarged diagram of an optimization sectional view of a crossline and an enlarged diagram of an original sectional view of the crossline according to application example 1 of the present disclosure.
Figure 9B:
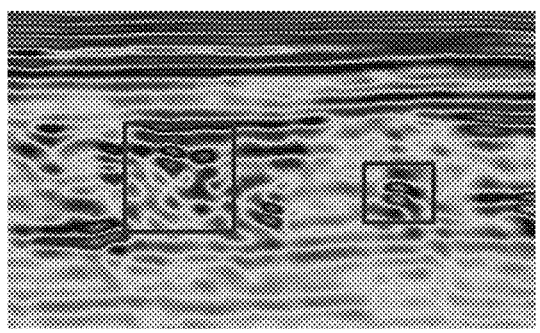

FIG. 8 shows a diagram of an optimization sectional view of a crossline according to application example 1 of the present disclosure. FIGS. 9a and 9b respectively show an enlarged diagram of an optimization sectional view of a crossline and an enlarged diagram of an original sectional view of the crossline according to application example 1 of the present disclosure. Compared with the original sectional view as shown in FIG. 9b, in the optimization sectional view as shown in FIG. 9a, a double-beads image has a better convergence, and two beads can be separated from each other better; and a single-bead image has a smaller "tail" and a better convergence. It can be seen that, in the sectional view obtained by the automatic focus identification method for the Karst cave reservoir according to the present disclosure, the "beads" imaging has a better convergence and a higher accuracy. Therefore, a reservoir prediction accuracy and a drilling success rate can both be improved.

Application Example 2

FIG. 4 schematically shows along layer velocity replacement according to application example 1 or application example 2 of the present disclosure. As shown in FIG. 4, according to a velocity of an actual stratum in Xinjiang work area of China, it is assumed that an initial migration velocity is v, a minimum replacement velocity is 0.99 v, a maximum replacement velocity is 1.01 v, and a replacement velocity change interval is 0.0025 v.

FIGS. 5a to 5i are sectional views of along layer velocity replacement pre-stack time migration according to application example 1 or application example 2 of the present disclosure. Continuous pre-stack time migration is performed according to different replacement velocities to obtain different post-stack seismic data volumes. The migration result of initial migration velocity v is shown in FIG. 5e, the migration results of replacement velocities in FIGS. 5a to 5d are respectively 0.99 v, 0.9925 v, 0.995 v, and 0.9975 v, and the replacement velocities in FIGS. 5f to 5i are respectively 1.0025 v, 1.005 v, 1.0075 v, and 1.01 v. Therefore, 9 migration stacking volumes based on different migration velocities can be obtained.

FIG. 6 shows a scanning diagram of a three dimensional cube window according to application example 1 or application example 2 of the present disclosure, wherein x axis is a cross-line (Xline), and y axis is an in-line. A proper three dimensional cube window is selected according to a size of a beads-shaped seismic response characteristic of the seismic data. In this work area, a 7×7×15 window is selected. That is, the window is represented by 7 in-lines, 7 cross-lines, and 15 time sampling points. The amplitude attributes of different replacement migration velocity volumes in the three dimensional cube window are censused according to L1 norm criterion.

Figure 10:
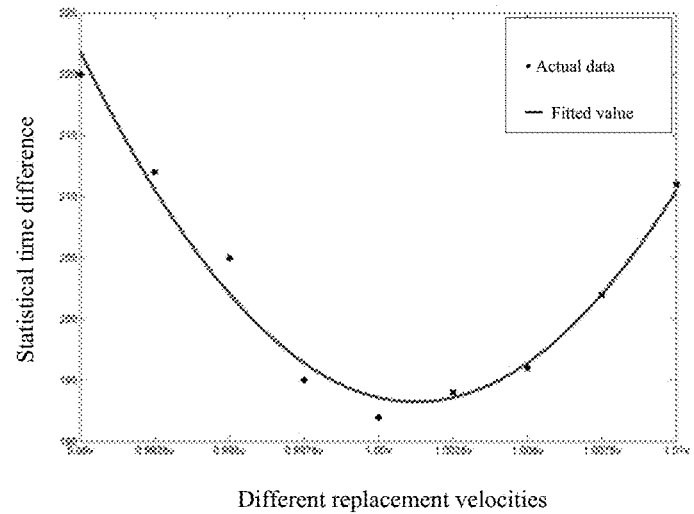
FIG. 10 schematically shows changing of time difference of an imaging point with migration velocity according to application example 2 of the present disclosure.

FIG. 10 schematically shows changing of time difference of an imaging point with migration velocity according to application example 2 of the present disclosure. Taking one imaging point as an example, each of the data has a minimum time difference value and a corresponding subscript. Therefore, a time difference extremum and a corresponding subscript are evaluated through a least-squares extremum fit algorithm so as to obtain the optimized migration velocity and the optimized seismic trace.

Figure 11:
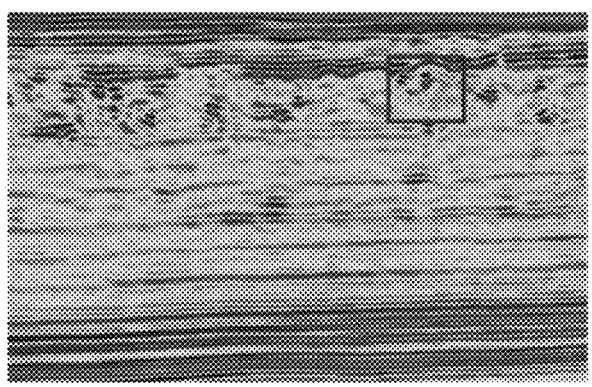
FIG. 11 shows a diagram of an optimization sectional view of a crossline according to application example 2 of the present disclosure.
Figure 12A:
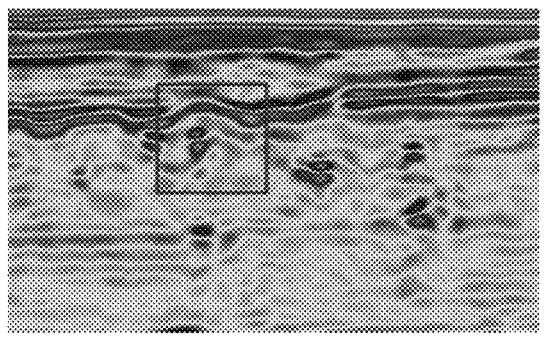
FIGS. 12a and 12b respectively show an enlarged diagram of an optimization sectional view of a crossline and an enlarged diagram of an original sectional view of the crossline according to application example 2 of the present disclosure.
Figure 12B:
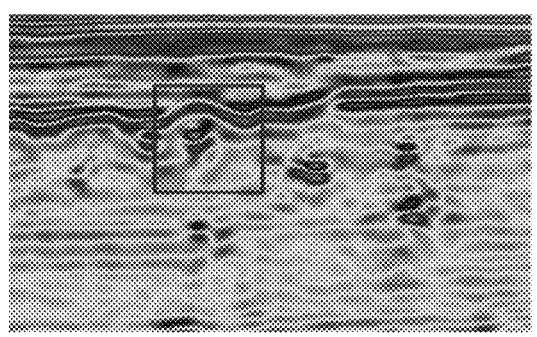

FIG. 11 shows a diagram of an optimization sectional view of a crossline according to application example 2 of the present disclosure. FIGS. 12a and 12b respectively show an enlarged diagram of an optimization sectional view of a crossline and an enlarged diagram of an original sectional view of the crossline according to application example 2 of the present disclosure. Compared with the original sectional view as shown in FIG. 12b, in the optimization sectional view as shown in FIG. 12a, the "beads" imaging has a smaller "tail" and a better convergence. It can be seen that, in the sectional view obtained by the automatic focus identification method for the Karst cave reservoir according to the present disclosure, the "beads" imaging has a better convergence and a higher accuracy. Therefore, a reservoir prediction accuracy and a drilling success rate can both be improved.

It can be understood that, the embodiments disclosed herein are only used for illustrating the beneficial effects thereof in an exemplary way, rather than restricting the present disclosure.

Embodiment 5

The present embodiment provides an automatic focus identification system for a Karst cave reservoir. According to the embodiment of the present disclosure, the automatic focus identification system for the Karst cave reservoir comprises a replacement module, a migration module, a selecting module, a first obtaining module, and a second obtaining module that are connected in sequence.

Specifically, the replacement module is configured to perform velocity replacement based on a pre-stack time migration velocity model to obtain a plurality of replacement migration velocity volumes. Preferably, the replacement module is specifically configured to define a minimum replacement velocity, a maximum replacement velocity, and a replacement velocity change interval based on the pre-stack time migration velocity model, and perform velocity replacement on an existing migration velocity along a marker bed so as to obtain the plurality of replacement migration velocity volumes.

The migration module is configured to perform pre-stack time migration based on the plurality of replacement migration velocity volumes to obtain a plurality of post-stack seismic data volumes corresponding to the plurality of replacement migration velocity volumes one to one.

The selecting module is configured to select a three dimensional cube window based on a seismic response characteristic of the Karst cave reservoir.

The first obtaining module is configured to obtain sparse statistical data of a seismic trace or sparse statistical data of a seismic trace attribute of each of the post-stack seismic data volumes in the three dimensional cube window respectively.

The second obtaining module is configured to obtain an optimized migration velocity and an optimized seismic trace through optimization determination based on the sparse statistical data of the seismic trace or the sparse statistical data of the seismic trace attribute corresponding to all of the post-stack seismic data volumes.

In one example, the first obtaining module is specifically configured to obtain the sparse statistical data of the seismic trace corresponding to the post-stack seismic data volumes according to L1 norm criterion or Cauchy norm criterion.

In one example, the second obtaining module is specifically configured to evaluate a maximum value of the sparse statistical data of the seismic trace and a corresponding subscript based on the sparse statistical data of the seismic trace corresponding to all of the post-stack seismic data volumes so as to obtain the optimized migration velocity and the optimized seismic trace.

In one example, the automatic focus identification system for a Karst cave reservoir further comprises a constraint module. The constraint module is configured to perform smoothness constraint on the optimized migration velocity and the optimized seismic trace obtained therein respectively.

In one example, the seismic trace attribute is statistical instantaneous amplitude.

When the seismic trace attribute is statistical instantaneous amplitude, the first obtaining module is specifically configured to census instantaneous amplitudes of a post-stack seismic data volume in the three dimensional cube window according to L1 norm criterion so as to obtain the sparse statistical data of the statistical instantaneous amplitude corresponding to the post-stack seismic data volume. The second obtaining module is specifically configured to evaluate a maximum value of the sparse statistical data of the statistical instantaneous amplitude and a corresponding subscript based on the sparse statistical data of the statistical instantaneous amplitude corresponding to all of the post-stack seismic data volumes so as to obtain the optimized migration velocity and the optimized seismic trace.

The second obtaining module is specifically configured to fit the sparse statistical data of the statistical instantaneous amplitude corresponding to all of the post-stack seismic data volumes through a least-squares extremum fit algorithm so as to obtain the maximum value of the sparse statistical data of the statistical instantaneous amplitude and the corresponding subscript.

In one example, the seismic trace attribute is statistical time difference.

When the seismic trace attribute is statistical time difference, the first obtaining module is specifically configured to census time difference information of a post-stack seismic data volume in the three dimensional cube window according to L1 norm criterion so as to obtain the sparse statistical data of the statistical time difference corresponding to the post-stack seismic data volume. Further, the first obtaining module is specifically configured to represent each sampling point of the post-stack seismic data volume in the three dimensional cube window by its surrounding multiple traces and multiple sampling points, perform slide scanning on the seismic data, select a center trace as a reference, cross-correlate other traces in the three dimensional cube window and the center trace, and obtain the time difference information when a cross-correlation function has a maximum value.

Preferably, the second obtaining module is specifically configured to evaluate a minimum value of the sparse statistical data of the statistical time difference and a corresponding subscript based on the sparse statistical data of the statistical time difference corresponding to all of the post-stack seismic data volumes by fitting through a least-squares extremum fit algorithm so as to obtain the optimized migration velocity and the optimized seismic trace.

According to the present embodiment, a continuous pre-stack time migration can be performed through migration velocity replacement of a target layer to obtain migration profiles with different imaging effects, and the optimized migration velocity and the optimized seismic trace can be obtained according to a difference among sparse statistical data so as to improve a reservoir prediction accuracy and a drilling success rate.

It can be understood that, the embodiments disclosed herein are only used for illustrating the beneficial effects thereof in an exemplary way, rather than restricting the present disclosure.

With respect to the specific operations of each of the aforesaid modules, reference can be made to the illustration on the method of the present disclosure combining FIGS. 1 to 12b disclosed hereinabove, and the details thereof will not be repeated here.

Apparently, it can be understood by those skilled in the art that, each of the modules and steps of the present disclosure can be realized with a general computing device. They can be centralized in one single computing device, or can be distributed in a network consisting of a plurality of computing devices. Optionally, they can be realized with program codes executable in computing devices, and can thus be stored in storage devices to be executed by the computing devices. Alternatively, they can be made into integrated circuit modules respectively, or a plurality of modules or steps of them can be made into one single integrated circuit module. In this manner, the present disclosure is not limited to any specific combination of hardware and software.

The embodiments of the present disclosure are illustrated in detail hereinabove. However, the embodiments are exemplary ones, rather than exhaustive ones. Moreover, the present disclosure is not limited by the embodiments disclosed herein. Those skilled in the art can make amendments and replacements to the embodiments without departing from the spirit and scope of the present disclosure. The technical terms used herein are aimed at illustrating the principles, actual uses, or technical improvements of the embodiments, or facilitating understanding for those skilled in the art on the embodiments disclosed herein.

The invention claimed is:

1. An automatic focus identification method for a Karst cave reservoir, comprising steps of:
   performing velocity replacement based on a pre-stack time migration velocity model to obtain a plurality of replacement migration velocity volumes;
   performing pre-stack time migration based on the plurality of replacement migration velocity volumes to obtain a plurality of post-stack seismic data volumes corresponding to the plurality of replacement migration velocity volumes one to one;
   selecting a three dimensional cube window based on a seismic response characteristic of the Karst cave reservoir of seismic data;
   obtaining sparse statistical data of a seismic trace, or sparse statistical data of a seismic trace attribute of each of the post-stack seismic data volumes respectively in the three dimensional cube window; and
   obtaining an optimized migration velocity and an optimized seismic trace through optimization determination, based on the sparse statistical data of the seismic trace, or the sparse statistical data of the seismic trace attribute corresponding to all of the post-stack seismic data volumes.

2. The method according to claim 1, wherein the sparse statistical data of the seismic trace corresponding to the post-stack seismic data volumes are obtained according to L1 norm criterion or Cauchy norm criterion.

3. The method according to claim 2, further comprising evaluating a maximum value of the sparse statistical data of the seismic trace and a corresponding subscript based on the sparse statistical data of the seismic trace corresponding to all of the post-stack seismic data volumes so as to obtain the optimized migration velocity and the optimized seismic trace.

4. The method according to claim 1, further comprising performing smoothness constraint on the optimized migration velocity and the optimized seismic trace obtained therein respectively.

5. The method according to claim 1, wherein the seismic trace attribute is statistical instantaneous amplitude.

6. The method according to claim 5, wherein a step of obtaining sparse statistical data of the statistical instantaneous amplitude corresponding to a post-stack seismic data volume comprises:
   censusing instantaneous amplitudes of the post-stack seismic data volume in the three dimensional cube window according to L1 norm criterion so as to obtain the sparse statistical data of the statistical instantaneous amplitude corresponding to the post-stack seismic data volume.

7. The method according to claim 6, wherein a step of obtaining an optimized migration velocity and an optimized seismic trace through optimization determination based on the sparse statistical data of the statistical instantaneous amplitude corresponding to all of the post-stack seismic data volumes comprises:
   evaluating a maximum value of the sparse statistical data of the statistical instantaneous amplitude and a corresponding subscript based on the sparse statistical data of the statistical instantaneous amplitude corresponding to all of the post-stack seismic data volumes so as to obtain the optimized migration velocity and the optimized seismic trace.

8. The method according to claim 7, further comprising fitting the sparse statistical data of the statistical instantaneous amplitude corresponding to all of the post-stack seismic data volumes through a least-squares extremum fit algorithm so as to obtain the maximum value of the sparse statistical data of the statistical instantaneous amplitude and the corresponding subscript.

9. The method according to claim 5, wherein the seismic trace attribute is statistical time difference.

10. The method according to claim 9, wherein a step of obtaining sparse statistical data of the statistical time difference corresponding to a post-stack seismic data volume comprises:

censusing time difference information of the post-stack seismic data volume in the three dimensional cube window according to L1 norm criterion so as to obtain the sparse statistical data of the statistical time difference corresponding to the post-stack seismic data volume.

11. The method according to claim 10, wherein a step of censusing the time difference information comprises representing each sampling point of the post-stack seismic data volume in the three dimensional cube window by its surrounding multiple traces and multiple sampling points, performing slide scanning on the seismic data, selecting a center trace as a reference, cross-correlating other traces in the three dimensional cube window with the center trace, and obtaining the time difference information when a cross-correlation function has a maximum value.

12. The method according to claim 11, wherein a step of obtaining an optimized migration velocity and an optimized seismic trace through optimization determination based on the sparse statistical data of the statistical time difference corresponding to all of the post-stack seismic data volumes comprises:

evaluating a minimum value of the sparse statistical data of the statistical time difference and a corresponding subscript based on the sparse statistical data of the statistical time difference corresponding to all of the post-stack seismic data volumes by fitting through a least-squares extremum fit algorithm so as to obtain the optimized migration velocity and the optimized seismic trace.

13. The method according to claim 1, wherein a step of obtaining the plurality of replacement migration velocity volumes comprises:

defining a minimum replacement velocity, a maximum replacement velocity, and a replacement velocity change interval based on the pre-stack time migration velocity model, and performing velocity replacement on an existing migration velocity along a marker bed so as to obtain the plurality of replacement migration velocity volumes.

14. An automatic focus identification system for a Karst cave reservoir, comprising:

a replacement module, configured to perform velocity replacement based on a pre-stack time migration velocity model to obtain a plurality of replacement migration velocity volumes;

a migration module, configured to perform pre-stack time migration, based on the plurality of replacement migration velocity volumes, to obtain a plurality of post-stack seismic data volumes corresponding to the plurality of replacement migration velocity volumes one to one;

a selecting module, configured to select a three dimensional cube window based on a seismic response characteristic of the Karst cave reservoir;

a first obtaining module, configured to obtain sparse statistical data of a seismic trace or sparse statistical data of a seismic trace attribute of each of the post-stack seismic data volumes in the three dimensional cube window respectively; and a second obtaining module, configured to obtain an optimized migration velocity and an optimized seismic trace through optimization determination based on the sparse statistical data of the seismic trace or the sparse statistical data of the seismic trace attribute corresponding to all of the post-stack seismic data volumes.

15. The system according to claim 14, wherein the first obtaining module is specifically configured to obtain the sparse statistical data of the seismic trace corresponding to the post-stack seismic data volumes according to L1 norm criterion or Cauchy norm criterion.

16. The system according to claim 15, wherein the second obtaining module is specifically configured to evaluate a maximum value of the sparse statistical data of the seismic trace and a corresponding subscript based on the sparse statistical data of the seismic trace corresponding to all of the post-stack seismic data volumes so as to obtain the optimized migration velocity and the optimized seismic trace.

17. The system according to claim 14, further comprising a constraint module which is configured to perform smoothness constraint on the optimized migration velocity and the optimized seismic trace obtained therein respectively.

18. The system according to claim 14, wherein the seismic trace attribute is statistical instantaneous amplitude.

19. The system according to claim 18, wherein the first obtaining module is specifically configured to census instantaneous amplitudes of a post-stack seismic data volume in the three dimensional cube window according to L1 norm criterion so as to obtain the sparse statistical data of the statistical instantaneous amplitude corresponding to the post-stack seismic data volume.

20. The system according to claim 19, wherein the second obtaining module is specifically configured to evaluate a maximum value of the sparse statistical data of the statistical instantaneous amplitude and a corresponding subscript based on the sparse statistical data of the statistical instantaneous amplitude corresponding to all of the post-stack seismic data volumes so as to obtain the optimized migration velocity and the optimized seismic trace.

21. The system according to claim 20, wherein the second obtaining module is specifically configured to fit the sparse statistical data of the statistical instantaneous amplitude corresponding to all of the post-stack seismic data volumes through a least-squares extremum fit algorithm so as to obtain the maximum value of the sparse statistical data of the statistical instantaneous amplitude and the corresponding subscript.

22. The system according to claim 14, wherein the seismic trace attribute is statistical time difference.

23. The system according to claim 22, wherein the first obtaining module is specifically configured to census time difference information of a post-stack seismic data volume in the three dimensional cube window according to L1 norm criterion so as to obtain the sparse statistical data of the statistical time difference corresponding to the post-stack seismic data volume.

24. The system according to claim 23, wherein the first obtaining module is specifically configured to represent each sampling point of the post-stack seismic data volume in the three dimensional cube window by its surrounding multiple traces and multiple sampling points, perform slide scanning on the seismic data, select a center trace as a reference, cross-correlate other traces in the three dimensional cube window with the center trace, and obtain the time difference information when a cross-correlation function has a maximum value.

25. The system according to claim 24, wherein the second obtaining module is specifically configured to evaluate a minimum value of the sparse statistical data of the statistical time difference and a corresponding subscript, based on the sparse statistical data of the statistical time difference corresponding to all of the post-stack seismic data volumes, by fitting through a least-squares extremum fit algorithm, so as to obtain the optimized migration velocity and the optimized seismic trace.

26. The system according to claim 14, wherein the replacement module is specifically configured to define a minimum replacement velocity, a maximum replacement velocity, and a replacement velocity change interval based on the pre-stack time migration velocity model, and perform velocity replacement on an existing migration velocity along a marker bed so as to obtain the plurality of replacement migration velocity volumes.

* * * * *